(12) United States Patent
Goldsmith

(10) Patent No.: US 12,547,986 B2
(45) Date of Patent: Feb. 10, 2026

(54) METHOD AND SYSTEM FOR DISTRIBUTION LIST EVENT UPDATER

(71) Applicant: JPMorgan Chase Bank, N.A., New York, NY (US)

(72) Inventor: Bret Goldsmith, Sugar Land, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 362 days.

(21) Appl. No.: 18/108,896

(22) Filed: Feb. 13, 2023

(65) Prior Publication Data

US 2024/0273475 A1   Aug. 15, 2024

(51) Int. Cl.
| | | |
|---|---|---|
| G06Q 10/10 | (2023.01) | |
| G06Q 10/107 | (2023.01) | |
| G06Q 10/1093 | (2023.01) | |

(52) U.S. Cl.
CPC ....... G06Q 10/1093 (2013.01); G06Q 10/107 (2013.01)

(58) Field of Classification Search
CPC ...................................................... G06Q 10/10
USPC ......................................................... 705/7.19
See application file for complete search history.

(56) References Cited

U.S. PATENT DOCUMENTS

| | | | | |
|---|---|---|---|---|
| 2009/0319913 A1* | 12/2009 | Serr | .................... | H04L 12/1827 715/753 |
| 2010/0223088 A1* | 9/2010 | Martin | ................. | G06Q 10/109 705/7.18 |
| 2013/0254278 A1* | 9/2013 | Buhr | ...................... | G06Q 50/01 709/204 |
| 2013/0263020 A1* | 10/2013 | Heiferman | .......... | H04L 12/1818 715/753 |
| 2014/0201277 A1* | 7/2014 | DeLuca | ............... | G06Q 10/109 709/204 |
| 2020/0366632 A1* | 11/2020 | Daptardar | ............. | H04L 51/212 |
| 2022/0237569 A1* | 7/2022 | Sharma | ................... | H04L 67/55 |

* cited by examiner

*Primary Examiner* — Nga B Nguyen
(74) *Attorney, Agent, or Firm* — GREENBLUM & BERNSTEIN, P.L.C.

(57) ABSTRACT

A method for providing a dynamic distribution list event updater is disclosed. The method includes monitoring, via a bot, an electronic communication platform; receiving, via the bot, an indication of a modification to a distribution list, the indication including modified membership information and event information; identifying, via an application programming interface, persisted membership information that corresponds to the distribution list; determining a new user based on a comparison of the modified membership information and the persisted membership information; and transmitting, via the electronic communication platform, a notification to the new user.

20 Claims, 5 Drawing Sheets

METHOD AND SYSTEM FOR DISTRIBUTION LIST EVENT UPDATER

BACKGROUND

1. Field of the Disclosure

This technology generally relates to methods and systems for updating events, and more particularly to methods and systems for providing a dynamic event updater that automatically manages recurring calendar events of distribution lists.

2. Background Information

Many business entities rely on distribution lists to facilitate scheduled meetings between various users. Often, the scheduled meetings are recurring for each of the members of the distribution lists. Historically, implementations of conventional distribution list management techniques have resulted in varying degrees of success with respect to effective and accurate management of recurring meetings for new members of the distribution lists.

One drawback of using the conventional distribution list management techniques is that in many instances, the distribution lists and the recurring meetings are separately administered. As such, newly added members of the distribution lists may not be aware of the recurring meetings that are associated with the distribution lists. Additionally, existing members of the distribution lists may not realize that the newly added members are not aware of the recurring meetings until after a missed meeting by the newly added members.

Therefore, there is a need to provide a dynamic distribution list event updater that automatically monitors distribution list changes, identifies newly added members to the distribution lists, and forwards recurring meeting invites to the newly added members of the distribution lists.

SUMMARY

The present disclosure, through one or more of its various aspects, embodiments, and/or specific features or sub-components, provides, inter alia, various systems, servers, devices, methods, media, programs, and platforms for providing a dynamic event updater that automatically manages recurring calendar events of distribution lists.

According to an aspect of the present disclosure, a method for providing a dynamic distribution list event updater is disclosed. The method is implemented by at least one processor. The method may include monitoring, via at least one bot, at least one electronic communication platform; receiving, via the at least one bot, at least one indication of a modification to at least one distribution list, the at least one indication may include modified membership information and event information; identifying, via an application programming interface, persisted membership information that corresponds to the at least one distribution list; determining at least one new user based on a comparison of the modified membership information and the persisted membership information; and transmitting, via the at least one electronic communication platform, at least one notification to the at least one new user.

In accordance with an exemplary embodiment, the at least one electronic communication platform may include an email client and a calendaring client of a personal information manager.

In accordance with an exemplary embodiment, the at least one indication may be automatically parsed by using a natural language processor to identify the modified membership information and the event information.

In accordance with an exemplary embodiment, the modification may correspond to addition of the at least one new user to the at least one distribution list.

In accordance with an exemplary embodiment, the determining may be initiated based on a predetermined schedule, the predetermined schedule may include a daily schedule.

In accordance with an exemplary embodiment, the at least one notification may include the event information, the event information may relate to an electronic invitation for a scheduled meeting.

In accordance with an exemplary embodiment, the method may further include receiving, via the at least one bot, at least one second indication of a second modification to the at least one distribution list, the at least one second indication may relate to a removal of at least one existing user; parsing the at least one second indication to identify the at least one existing user; and updating, via the application programming interface, the persisted membership information that corresponds to the at least one distribution list according to the at least one second indication.

In accordance with an exemplary embodiment, the method may further include automatically updating, via the at least one electronic communication platform, at least one calendaring client according to the event information, the at least one calendaring client may correspond to the at least one new user.

In accordance with an exemplary embodiment, the method may further include generating at least one log file when the at least one notification is transmitted to the at least one new user, the at least one log file may include information that relates to the at least one new user, the notification transmission, and the at least one distribution list; and associating the at least one log file with the at least one distribution list.

According to an aspect of the present disclosure, a computing device configured to implement an execution of a method for providing a dynamic distribution list event updater is disclosed. The computing device including a processor; a memory; and a communication interface coupled to each of the processor and the memory, wherein the processor may be configured to monitor, via at least one bot, at least one electronic communication platform; receive, via the at least one bot, at least one indication of a modification to at least one distribution list, the at least one indication may include modified membership information and event information; identify, via an application programming interface, persisted membership information that corresponds to the at least one distribution list; determine at least one new user based on a comparison of the modified membership information and the persisted membership information; and transmit, via the at least one electronic communication platform, at least one notification to the at least one new user.

In accordance with an exemplary embodiment, the at least one electronic communication platform may include an email client and a calendaring client of a personal information manager.

In accordance with an exemplary embodiment, the processor may be further configured to automatically parse the at least one indication by using a natural language processor to identify the modified membership information and the event information.

In accordance with an exemplary embodiment, the modification may correspond to addition of the at least one new user to the at least one distribution list.

In accordance with an exemplary embodiment, the processor may be further configured to initiate the determining based on a predetermined schedule, the predetermined schedule may include a daily schedule.

In accordance with an exemplary embodiment, the at least one notification may include the event information, the event information relating to an electronic invitation for a scheduled meeting.

In accordance with an exemplary embodiment, the processor may be further configured to receive, via the at least one bot, at least one second indication of a second modification to the at least one distribution list, the at least one second indication may relate to a removal of at least one existing user; parse the at least one second indication to identify the at least one existing user; and update, via the application programming interface, the persisted membership information that corresponds to the at least one distribution list according to the at least one second indication.

In accordance with an exemplary embodiment, the processor may be further configured to automatically update, via the at least one electronic communication platform, at least one calendaring client according to the event information, wherein the at least one calendaring client may correspond to the at least one new user.

In accordance with an exemplary embodiment, the processor may be further configured to generate at least one log file when the at least one notification is transmitted to the at least one new user, the at least one log file may include information that relates to the at least one new user, the notification transmission, and the at least one distribution list; and associate the at least one log file with the at least one distribution list.

According to an aspect of the present disclosure, a non-transitory computer readable storage medium storing instructions for providing a dynamic distribution list event updater is disclosed. The storage medium including executable code which, when executed by a processor, may cause the processor to monitor, via at least one bot, at least one electronic communication platform; receive, via the at least one bot, at least one indication of a modification to at least one distribution list, the at least one indication may include modified membership information and event information; identify, via an application programming interface, persisted membership information that corresponds to the at least one distribution list; determine at least one new user based on a comparison of the modified membership information and the persisted membership information; and transmit, via the at least one electronic communication platform, at least one notification to the at least one new user.

In accordance with an exemplary embodiment, the at least one notification may include the event information, the event information may relate to an electronic invitation for a scheduled meeting.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
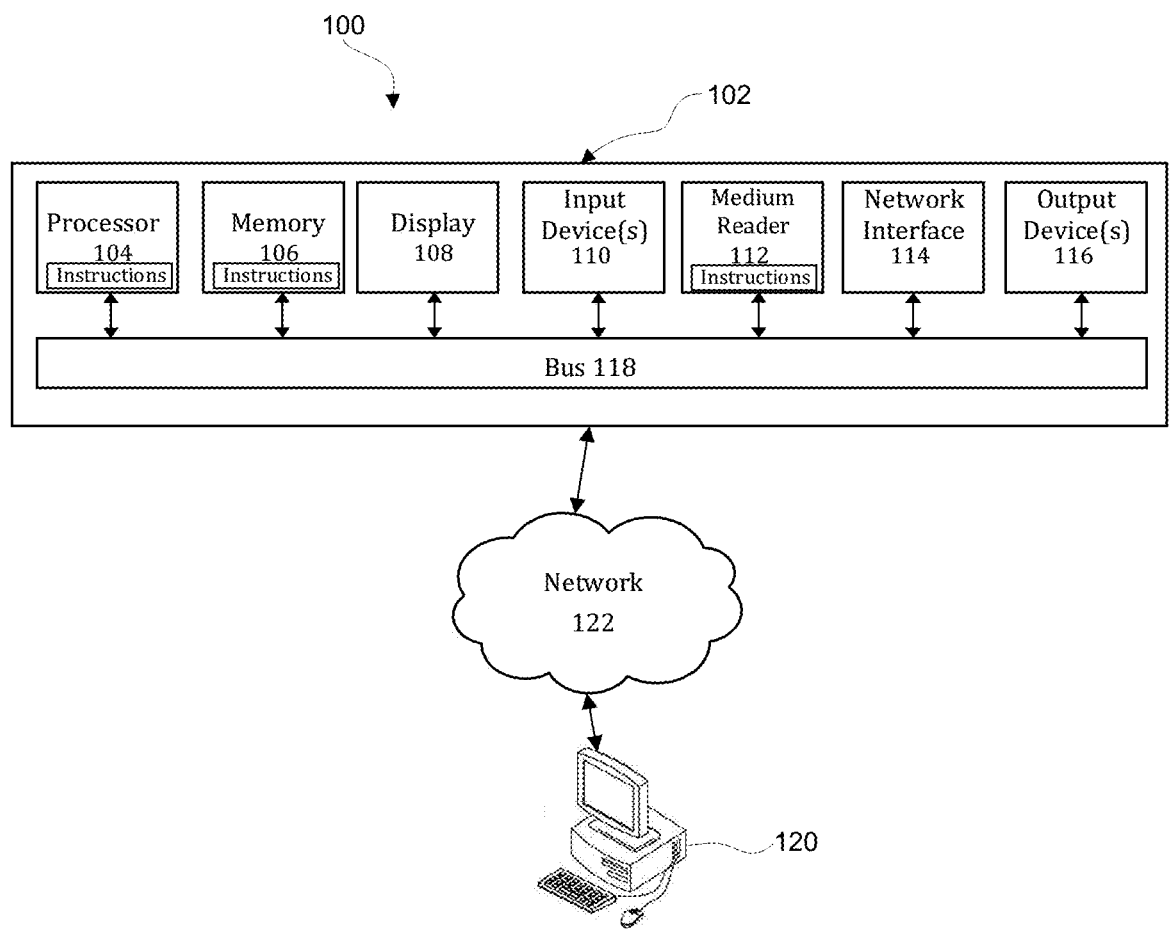
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons of ordinary skill in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, BLUETOOTH®, ZIGBEE®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a dynamic event updater that automatically manages recurring calendar events of distribution lists.

Figure 2:
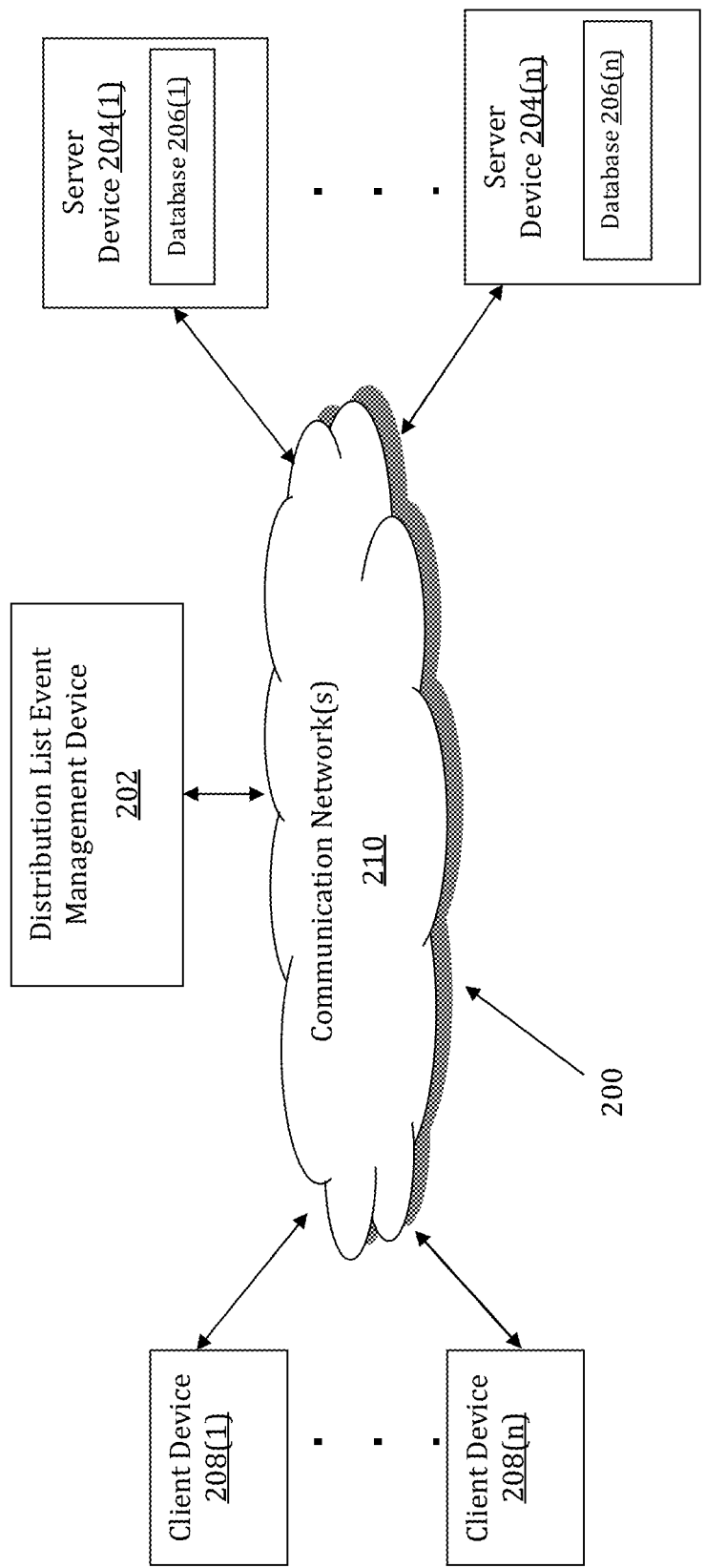
FIG. 2 illustrates an exemplary diagram of a network environment.

Referring to FIG. 2, a schematic of an exemplary network environment 200 for implementing a method for providing a dynamic event updater that automatically manages recurring calendar events of distribution lists is illustrated. In an exemplary embodiment, the method is executable on any networked computer platform, such as, for example, a personal computer (PC).

The method for providing a dynamic event updater that automatically manages recurring calendar events of distribution lists may be implemented by a Distribution List Event Management (DLEM) device 202. The DLEM device 202 may be the same or similar to the computer system 102 as described with respect to FIG. 1. The DLEM device 202 may store one or more applications that can include executable instructions that, when executed by the DLEM device 202, cause the DLEM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DLEM device 202 itself, may be located in virtual server(s) running in a cloud-based computing environment rather than being tied to one or more specific physical network computing devices. Also, the application(s) may be running in one or more virtual machines (VMs) executing on the DLEM device 202. Additionally, in one or more embodiments of this technology, virtual machine(s) running on the DLEM device 202 may be managed or supervised by a hypervisor.

In the network environment 200 of FIG. 2, the DLEM device 202 is coupled to a plurality of server devices 204(1)-204(n) that hosts a plurality of databases 206(1)-206(n), and also to a plurality of client devices 208(1)-208(n) via communication network(s) 210. A communication interface of the DLEM device 202, such as the network interface 114 of the computer system 102 of FIG. 1, operatively couples and communicates between the DLEM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DLEM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DLEM devices that efficiently implement a method for providing a dynamic event updater that automatically manages recurring calendar events of distribution lists.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DLEM device 202 may be a standalone device or integrated with one or more other devices or apparatuses, such as one or more of the server devices 204(1)-204(n), for example. In one particular example, the DLEM device 202 may include or be hosted by one of the server devices 204(1)-204(n), and other arrangements are also possible. Moreover, one or more of the devices of the DLEM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DLEM device 202 via the communication network(s) 210 according to the HTTP-based and/or JavaScript® Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to distribution lists, events, bots, electronic communication platforms, modifications, membership information, event information, persisted membership information, new users, notifications, emails, and recurring meeting invites.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DLEM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DLEM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DLEM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DLEM device 202, the server devices 204(1)-204(n), or the client devices 208(1)-208(n), for example, may be configured to operate as virtual instances on the same physical machine. In other words, one or more of the DLEM device 202, the server devices 204(1)-204(n), or the client devices 208(1)-208(n) may operate on the same physical device rather than as separate devices communicating through communication network(s) 210. Additionally, there may be more or fewer DLEM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
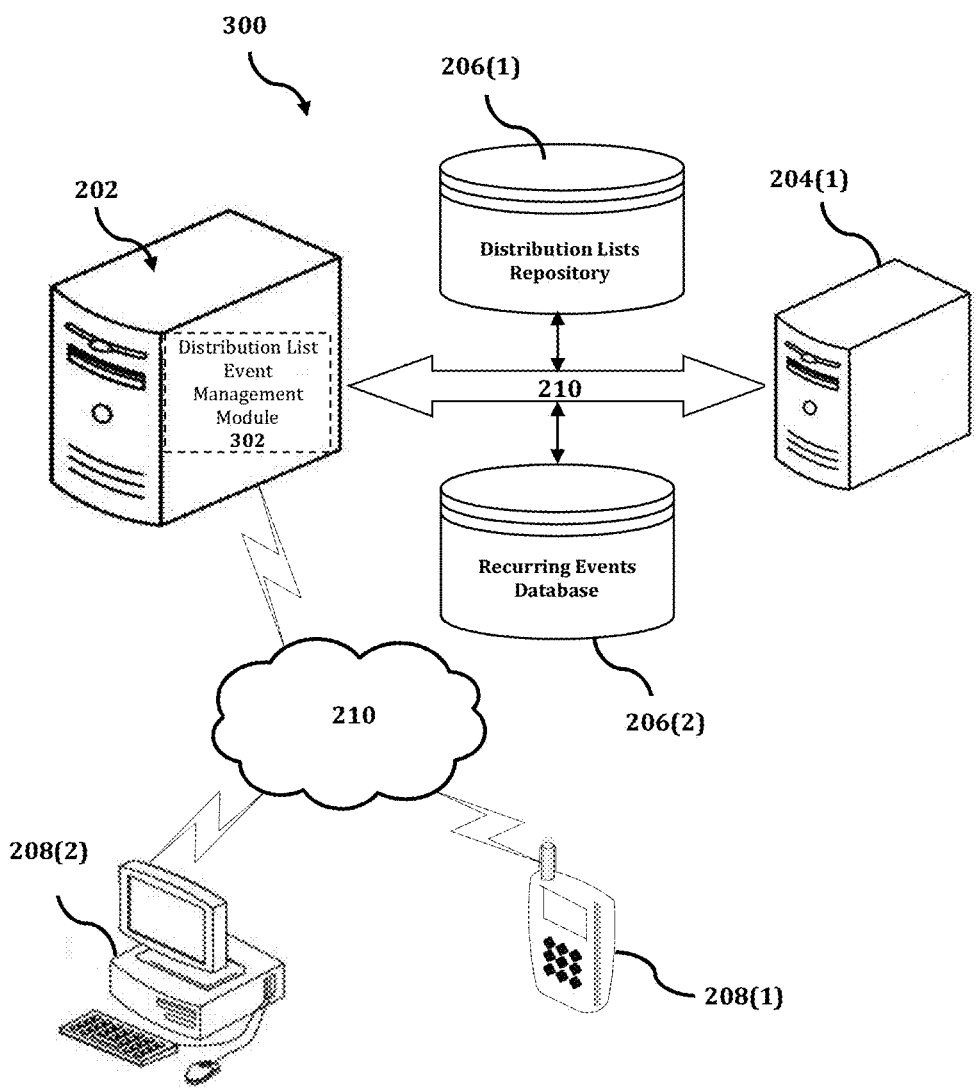
FIG. 3 shows an exemplary system for implementing a method for providing a dynamic event updater that automatically manages recurring calendar events of distribution lists.

The DLEM device 202 is described and shown in FIG. 3 as including a distribution list event management module 302, although it may include other rules, policies, modules, databases, or applications, for example. As will be described below, the distribution list event management module 302 is configured to implement a method for providing a dynamic event updater that automatically manages recurring calendar events of distribution lists.

An exemplary process 300 for implementing a mechanism for providing a dynamic event updater that automatically manages recurring calendar events of distribution lists by utilizing the network environment of FIG. 2 is shown as being executed in FIG. 3. Specifically, a first client device 208(1) and a second client device 208(2) are illustrated as being in communication with DLEM device 202. In this regard, the first client device 208(1) and the second client device 208(2) may be "clients" of the DLEM device 202 and are described herein as such. Nevertheless, it is to be known and understood that the first client device 208(1) and/or the second client device 208(2) need not necessarily be "clients" of the DLEM device 202, or any entity described in association therewith herein. Any additional or alternative relationship may exist between either or both of the first client device 208(1) and the second client device 208(2) and the DLEM device 202, or no relationship may exist.

Further, DLEM device 202 is illustrated as being able to access a distribution lists repository 206(1) and a recurring events database 206(2). The distribution list event management module 302 may be configured to access these databases for implementing a method for providing a dynamic event updater that automatically manages recurring calendar events of distribution lists.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DLEM device 202 via broadband or cellular communication. Of course, these embodiments are merely exemplary and are not limiting or exhaustive.

Upon being started, the distribution list event management module 302 executes a process for providing a dynamic event updater that automatically manages recurring calendar events of distribution lists. An exemplary process for providing a dynamic event updater that automatically manages recurring calendar events of distribution lists is generally indicated at flowchart 400 in FIG. 4.

Figure 4:
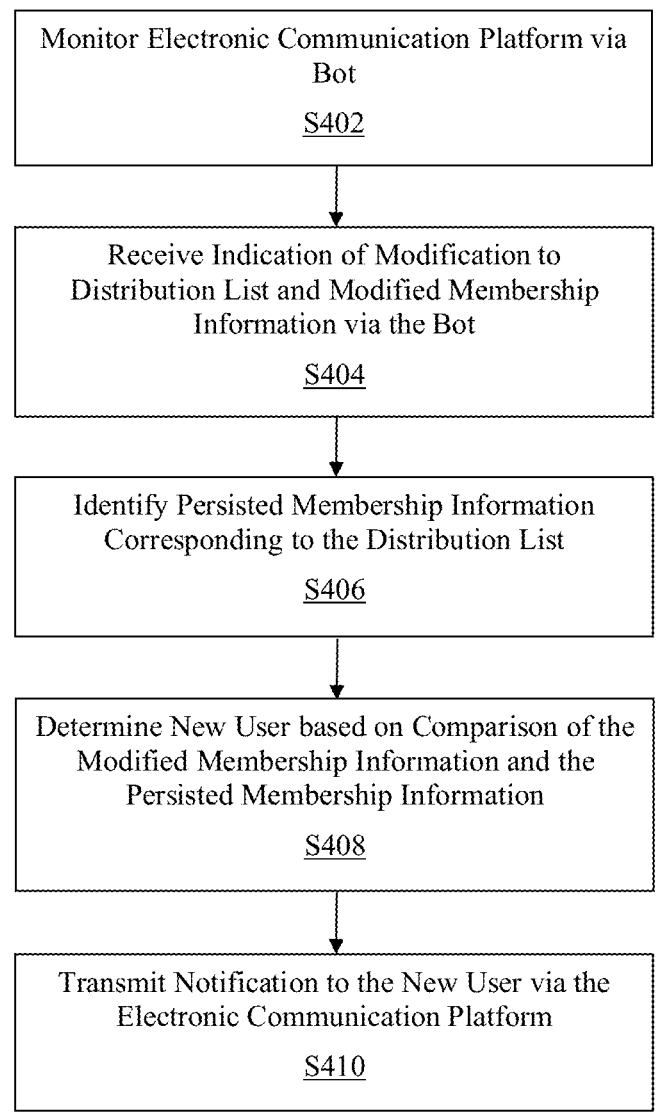
FIG. 4 is a flowchart of an exemplary process for implementing a method for providing a dynamic event updater that automatically manages recurring calendar events of distribution lists.

In the process 400 of FIG. 4, at step S402, an electronic communication platform may be monitored via a bot. In an exemplary embodiment, the electronic communication platform may include an email software client and a calendaring software client of a personal information manager. The personal information manager may relate to a type of application software that functions as a personal organizer.

In another exemplary embodiment, the personal information manager may facilitate the recording, tracking, and management of personal communications such as, for example, electronic messages as well as personal activities such as, for example, recurring meetings via a calendar. The personal information manager may include functions such as, for example, calendaring functions, email functions, task managing functions, contact managing functions, note-taking functions, journal logging functions, and web browsing functions.

In another exemplary embodiment, the bot may correspond to an autonomous program on a network that interacts with connected systems. The autonomous program may relate to a software application that executes commands, reply to event messages from other applications, and perform routine tasks automatically and/or with minimal human intervention. In another exemplary embodiment, the bot may include an application in an application network environment that is able to access a data stream to facilitate monitoring of the electronic communication platform. The bot may listen to data streams of various other applications as well as receive event messages directly via the data stream. For example, the application may listen in on the data stream between a plurality of other applications as well as receive event messages from the plurality of other applications.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA® platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

In another exemplary embodiment, the monitoring may include active monitoring of the electronic communication platform. Consistent with present disclosures, the electronic communication platform may be actively monitored as event messages are directly transmitted to the bot via an application communication interface. For example, the electronic communication platform may directly transmit an event message to the bot in response to a modification of a recurring meeting. In another exemplary embodiment, the monitoring may include passive monitoring of the electronic communication platform. Consistent with present disclosures, the electronic communication platform may be passively monitored by accessing a corresponding data stream. For example, the bot may monitor recurring meetings on the electronic communication platform by using meeting invite emails that that have been carbon copied to the bot.

At step S404, indications of a modification to a distribution list may be received via the bot. The indications may include modified membership information and event information. In an exemplary embodiment, the indications may correspond to a direct event message from the bot. The direct indication may include the modified membership information and the event information in a structured data set. In another exemplary embodiment, the indications may correspond to an electronic message that has been identified by the bot as including the modification to the distribution list. For example, the indication may relate to a recurring meeting invite that includes new members.

In another exemplary embodiment, the indications may be automatically parsed to identify the modified membership information and the event information. The indications may be automatically parsed by using an artificial intelligence technique and/or a machine learning technique such as, for example, a natural language processing technique. For example, when the indications correspond to a recurring meeting invite, the recurring meeting invite may be parsed to identify membership information such as a list of members as well as event information such as a time and a date of the event.

In another exemplary embodiment, the modification of the distribution list may correspond to addition of a new user to the distribution list. For example, the distribution list may be modified by an administrator to include new members to a weekly recurring meeting. In another exemplary embodiment, the modification of the distribution list may correspond to removal of an existing user from the distribution list. For example, the distribution list may be modified by the administrator to remove existing members from the weekly recurring meeting.

In another exemplary embodiment, the distribution list may relate to an application of email client programs that allows an administrator to maintain a list of email addresses and to send messages to all members of the distribution list at the same time. The distribution list may be usable to send emails to a group without having to enter each recipient's individual address. In another exemplary embodiment, the distribution list may correspond to a contact group that facilitates transmission of emails to groups with a shared characteristic such as, for example, a project team. The contact group may be addressed as a single recipient in the emails.

At step S406, persisted membership information that corresponds to the distribution list may be identified. The persisted membership information may be identified via an application programming interface. In an exemplary embodiment, the persisted membership information may relate to a previous state of the distribution list. For example, the persisted membership information may include a list of members of a recurring meeting as previously saved by the administrator. In another exemplary embodiment, the persisted membership information may correspond to an official list of members as maintained by a distribution list management system. The distribution list management system may relate to a centralized system that manages a plurality of distribution lists.

At step S408, a new user may be determined based on a comparison of the modified membership information and the persisted membership information. In an exemplary embodiment, the determining may be initiated based on a predetermined schedule. The predetermined schedule may include a daily schedule. For example, the determination may be made once a day for the distribution list based on all indications received that day. In another exemplary embodiment, the determining may be initiated ad hoc based on reception of the indication of a modification to the distribution list. For example, the determination may be made for the distribution list for each of the indications received.

In another exemplary embodiment, the new user may be determined based on a direct comparison between the modified membership information and the persisted membership information. The direct comparison may focus on differences between the modified membership information and the persisted membership information. For example, when information for user A is in the modified membership information but is not in the persisted membership information, the claimed system may determine that user A is a new user who has been added to the distribution list. Conversely, when information for user B is not in the modified membership information but is in the persisted membership information for example, the claimed system may determine that user B is an existing user removed from the distribution list.

At step S410, a notification may be transmitted to the new user. The notification may be transmitted via the electronic communication platform. In an exemplary embodiment, the notification may include the event information. The event information may relate to an electronic invitation for a scheduled meeting. For example, after determining that the new user has been added to a distribution list with a recurring meeting, the claimed invention may automatically forward the corresponding meeting invite to the new user. Consistent with present disclosures, automatically forwarding the corresponding meeting invite to the new user ensures that new joiners to a distribution list are aware of important meetings that they should attend.

In another exemplary embodiment, the notification may correspond to an initiation of an action that provides event information to the new user. The action may be initiated on a networked component via an application programming interface. For example, the notification may include initiated of instructions to the electronic communication platform to forward a corresponding meeting invite to the new user. Consistent with present disclosures, automatically forwarding the corresponding meeting invite to the new user ensures that new joiners to a distribution list are aware of important meetings that they should attend.

In another exemplary embodiment, a calendaring software client may be automatically updated according to the event information. The calendaring software client may be automatically updated via the electronic communication platform. The calendaring client may correspond to the new user. For example, the electronic communication platform may automatically update the calendaring software client of the new user to reflect addition of a new recurring meeting.

In another exemplary embodiment, a second indication of a second modification to the distribution list may be received via the bot consistent with present disclosures. The second indication may relate to a removal of an existing user. The second indication may be parsed to identify the existing user. Then, the persisted membership information that corresponds to the distribution list may be updated according to the second indication. The persisted membership information may be updated via the application programming interface.

In another exemplary embodiment, a log file may be automatically generated when the notification is transmitted to the new user. The log file may include information that relates to the new user, the notification transmission, and the distribution list. The log file may be associated with the distribution list to facilitate automated documentation of distribution list changes. Then, the log file and corresponding associations may be persisted in a repository.

Figure 5:
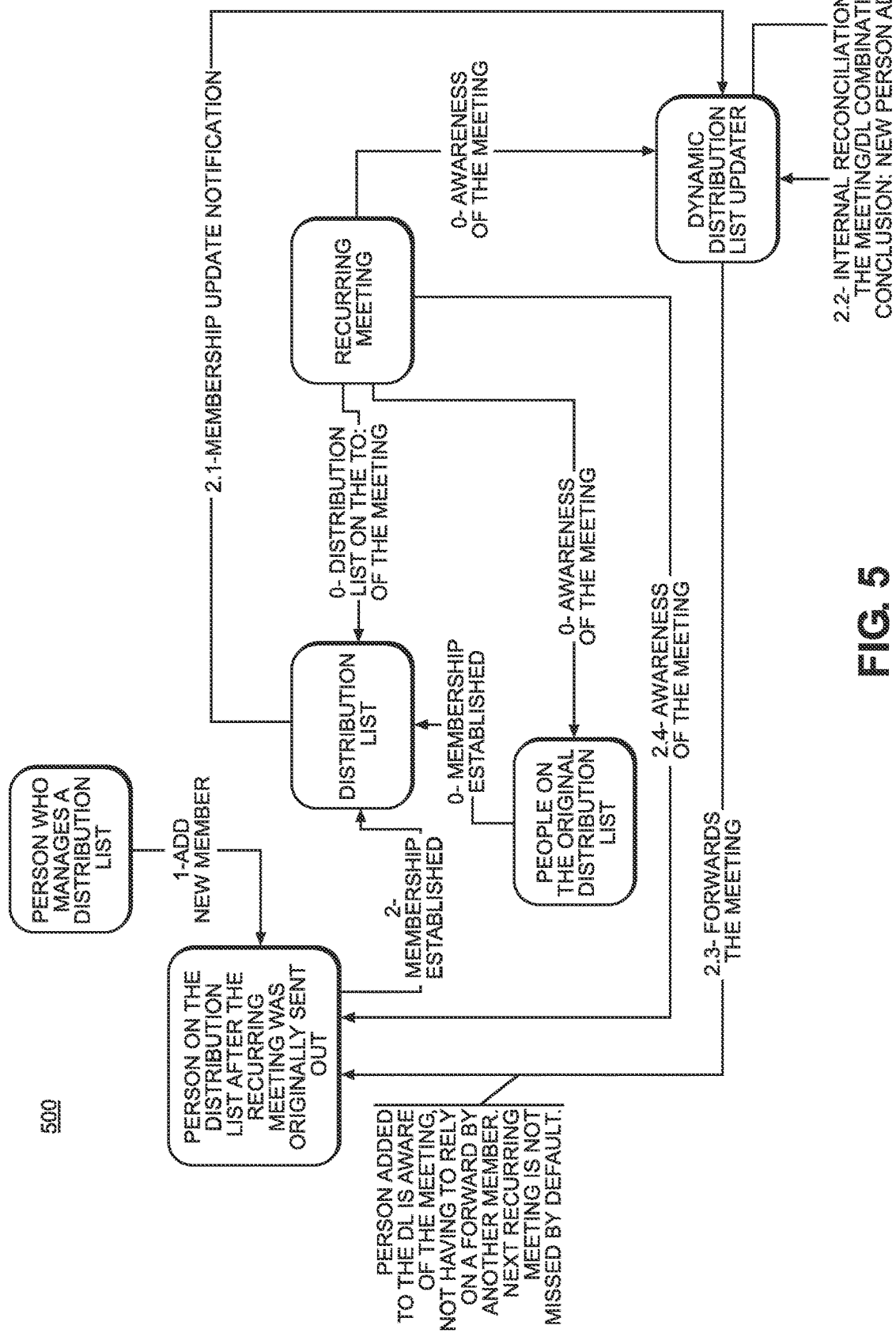
FIG. 5 is a flow diagram of an exemplary process for implementing a method for providing a dynamic event updater that automatically manages recurring calendar events of distribution lists.

FIG. 5 is a flow diagram 500 of an exemplary process for implementing a method for providing a dynamic event updater that automatically manages recurring calendar events of distribution lists. In FIG. 5, the claimed invention may be implemented as a separate application from existing distribution list management applications.

As illustrated in FIG. 5, at step 2.1, membership update notification may be received by a dynamic distribution list updater when new members are added to a distribution list as well as when existing members are removed from the distribution list. At step 2.2, the dynamic distribution list updater may internally reconcile the membership update based on meeting information and distribution list information. Based on the internal reconciliation, the dynamic distribution list updater may determine that a new member has been added.

Then, at step 2.3, a meeting invite that corresponds to the distribution list may be automatically forwarded to the new member. As such, at step 2.4, the new member of the distribution list is made aware of the meeting. Consistent with present disclosures, the new member of the distribution list is aware of the corresponding meeting without having to rely on another distribution list member forwarding the meeting invite. This awareness of the corresponding meeting prevents the new member from missing the next recurring meeting by default.

Accordingly, with this technology, an optimized process for providing a dynamic event updater that automatically manages recurring calendar events of distribution lists is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing a dynamic distribution list event updater, the method being implemented by at least one processor, the method comprising:

implementing at least one bot comprising an autonomous program that autonomously interacts with an event-driven architecture that includes an electronic communication platform comprising a distributed data streaming platform with a personal information manager application, wherein the personal information manager application includes digital tracking and management of a digital event message and a digital journal logging function;

accessing a digital data stream of the distributed data streaming platform by the at least one bot that enables an autonomous monitoring and receiving of the digital event message directly from the digital data stream and the personal information manager application;

performing a machine learning (ML) technique comprising natural language processing of at least one indication of a modification to at least one distribution list, the ML technique being associated with the at least one bot, and the at least one indication including modified membership information and event information;

implementing an application program interface, by the at least one processor via an application programming interface, with persisted membership information that corresponds to the at least one distribution list;

executing the application program interface, by the at least one processor, in obtaining at least one new user based on membership data between the modified membership information and the persisted membership information; and transmitting, by the at least one processor via the at least one electronic communication platform, at least one notification to the at least one new user.

2. The method of claim 1, wherein the at least one electronic communication platform includes an email client and a calendaring client of the personal information manager application.

3. The method of claim 1, wherein the at least one indication is automatically parsed by the natural language processing to identify the modified membership information and the event information.

4. The method of claim 1, wherein the modification corresponds to an addition of the at least one new user to the at least one distribution list, resulting in the modification to the at least one distribution list.

5. The method of claim 1, wherein the accessing the digital data stream of the distributed data streaming platform by the at least one bot is initiated based on a predetermined schedule, the predetermined schedule including a daily schedule.

6. The method of claim 1, wherein the at least one notification includes the event information, the event information relating to an electronic invitation for a scheduled meeting.

7. The method of claim 1, further comprising:
receiving, by the at least one processor via the at least one bot, at least one second indication of a second modification to the at least one distribution list, the at least one second indication relating to a removal of at least one existing user;

parsing, by the at least one processor, the at least one second indication to identify the at least one existing user; and updating, by the at least one processor via the application programming interface, the persisted membership information that corresponds to the at least one distribution list according to the at least one second indication.

8. The method of claim 1, further comprising:
automatically updating, by the at least one processor via the at least one electronic communication platform, at least one calendaring client according to the event information, wherein the at least one calendaring client corresponds to the at least one new user.

9. The method of claim 1, further comprising:
generating, by the at least one processor, at least one log file when the at least one notification is transmitted to the at least one new user, the at least one log file including information that relates to the at least one new user, the notification transmission, and the at least one distribution list; and associating, by the at least one processor, the at least one log file with the at least one distribution list.

10. A computing device configured to implement an execution of a method for providing a dynamic distribution list event updater, the computing device comprising:
a processor;
a memory; and
a communication interface coupled to each of the processor and the memory, wherein the processor is configured to:
implement at least one bot comprising an autonomous program that autonomously interacts with an event-driven architecture that includes an electronic communication platform comprising a distributed data streaming platform with a personal information manager application, wherein the personal information manager application includes digital tracking and management of a digital event message and a digital journal logging function;

access a digital data stream of the distributed data streaming platform by the at least one bot that enables an autonomous monitoring and receiving of the digital event message directly from the digital data stream and the personal information manager application;

perform a machine learning (ML) technique comprising natural language processing of at least one indication of a modification to at least one distribution list, the ML technique being associated with the at least one bot, and the at least one indication including modified membership information and event information;

implement an application program interface, via an application programming interface, with persisted membership information that corresponds to the at least one distribution list;

executing the application program interface in obtaining at least one new user based on membership data between the modified membership information and the persisted membership information; and transmit, via the at least one electronic communication platform, at least one notification to the at least one new user.

11. The computing device of claim 10, wherein the at least one electronic communication platform includes an email client and a calendaring client of the personal information manager application.

12. The computing device of claim 10, wherein the processor is further configured to automatically parse the at least one indication by using the natural language processing to identify the modified membership information and the event information.

13. The computing device of claim 10, wherein the modification corresponds to an addition of the at least one new user to the at least one distribution list, resulting in the modification to the at least one distribution list.

14. The computing device of claim 10, wherein the processor is further configured to initiate the accessing the digital data stream of the distributed data streaming platform by the at least one bot based on a predetermined schedule, the predetermined schedule including a daily schedule.

15. The computing device of claim 10, wherein the at least one notification includes the event information, the event information relating to an electronic invitation for a scheduled meeting.

16. The computing device of claim 10, wherein the processor is further configured to:
   receive, via the at least one bot, at least one second indication of a second modification to the at least one distribution list, the at least one second indication relating to a removal of at least one existing user;
   parse the at least one second indication to identify the at least one existing user; and
   update, via the application programming interface, the persisted membership information that corresponds to the at least one distribution list according to the at least one second indication.

17. The computing device of claim 10, wherein the processor is further configured to:
   automatically update, via the at least one electronic communication platform, at least one calendaring client according to the event information,
   wherein the at least one calendaring client corresponds to the at least one new user.

18. The computing device of claim 10, wherein the processor is further configured to:
   generate at least one log file when the at least one notification is transmitted to the at least one new user, the at least one log file including information that relates to the at least one new user, the notification transmission, and the at least one distribution list; and
   associate the at least one log file with the at least one distribution list.

19. A non-transitory computer readable storage medium storing instructions for providing a dynamic distribution list event updater, the storage medium comprising executable code which, when executed by a processor, causes the processor to:
   implement at least one bot comprising an autonomous program that autonomously interacts with an event-driven architecture that includes an electronic communication platform comprising a distributed data streaming platform with a personal information manager application, wherein the personal information manager application includes digital tracking and management of a digital event message and a digital journal logging function;
   access a digital data stream of the distributed data streaming platform by the at least one bot that enables an autonomous monitoring and receiving of the digital event message directly from the digital data stream and the personal information manager application;
   perform a machine learning (ML) technique comprising natural language processing of the ML technique being associated with the at least one bot, and at least one indication of a modification to at least one distribution list, the at least one indication including modified membership information and event information;
   implement an application program interface, via an application programming interface, with persisted membership information that corresponds to the at least one distribution list;
   execute the application program interface in obtaining at least one new user based on membership data between the modified membership information and the persisted membership information; and
   transmit, via the at least one electronic communication platform, at least one notification to the at least one new user.

20. The storage medium of claim 19, wherein the at least one notification includes the event information, the event information relating to an electronic invitation for a scheduled meeting.

* * * * *